United States Patent [19]

Duffty et al.

[11] Patent Number: 4,974,539
[45] Date of Patent: Dec. 4, 1990

[54] INTEGRATED PROPULSION AND HYDROFOIL SYSTEM

[75] Inventors: Bryan Duffty, Gilroy; Waldo E. Rodler, Jr., San Jose; Christopher D. Barry, San Francisco; Hans F. Woehrmann, Los Gatos, all of Calif.

[73] Assignee: FMC Corporation, Chicago, Ill.

[21] Appl. No.: 369,172

[22] Filed: Jun. 21, 1989

[51] Int. Cl.$^5$ .............................................. B63B 1/30
[52] U.S. Cl. ........................... 114/278; 114/282; 244/124; 244/214; 244/207
[58] Field of Search .................... 114/274–282; 440/45; 244/207, 123, 124, 214

[56] References Cited

U.S. PATENT DOCUMENTS

| | | | |
|---|---|---|---|
| 1,818,000 | 8/1931 | Moles | 244/214 X |
| 2,482,936 | 9/1949 | Renoux | 244/123 X |
| 3,027,862 | 4/1962 | Votre | 114/282 X |
| 3,093,219 | 6/1963 | Ramme | 244/124 |
| 3,183,871 | 5/1965 | Reder | 114/282 X |
| 3,343,513 | 9/1967 | Bader | 114/282 |
| 3,420,204 | 1/1969 | Samuel | 115/1 |
| 3,590,762 | 7/1971 | Yuan | 114/275 |
| 3,730,123 | 5/1973 | Lang | 114/275 X |
| 3,808,804 | 5/1974 | Scott-Scott | 440/45 X |
| 3,809,005 | 5/1974 | Rodler, Jr. | 115/12 |
| 4,050,397 | 9/1977 | Vanderleest | 114/274 |
| 4,073,257 | 4/1978 | Rodler, Jr. | 115/12 |
| 4,171,787 | 10/1979 | Zapel | 244/214 X |

OTHER PUBLICATIONS

An Article Entitled Hydrofoil Appearing on pp. 426–428 of vol. 12 of Collier's Encyclopedia, published by Crowell, Collier and MacMillan, Inc., in 1966.

*Primary Examiner*—Sherman Basinger
*Attorney, Agent, or Firm*—A. J. Moore; R. C. Kamp; R. B. Megley

[57] ABSTRACT

A pair of integrated water propulsion and hydrofoil systems capable of moving through water at speeds of at least 20 miles per hour are disclosed, each hydrofoil system having a hydrofoil and a mounting leg removably secured to a water propulsion system. The mounting legs are supported on opposite sides of the watercraft for moving the hydrofoils between a water mode and a land mode. The water propulsion system may be an inline water jet, and the hydrofoils may be formed from interconnected lightweight hollow beams with power operated flaps on the trailing portions of the hydrofoils for adding more lift when moving at slow speeds through water. The watercraft may be a military amphibious vehicle weighing about 30 tons.

2 Claims, 2 Drawing Sheets

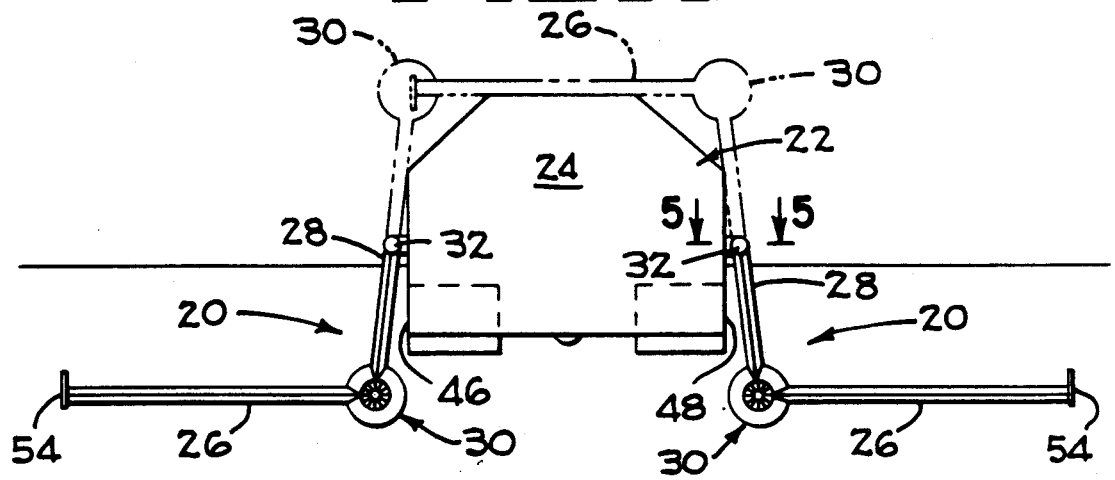
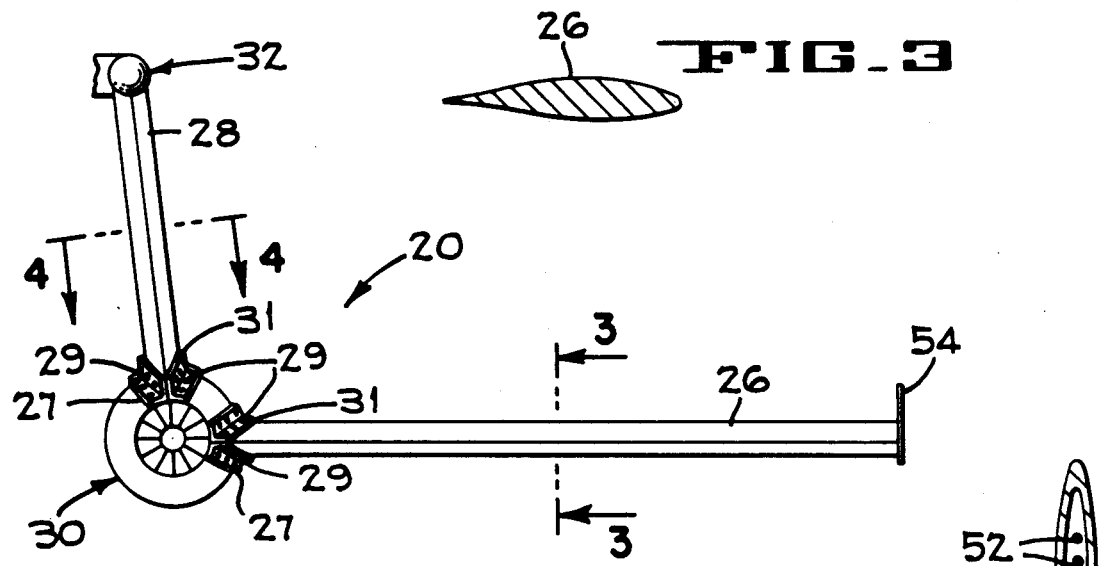
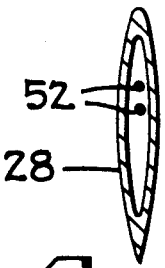
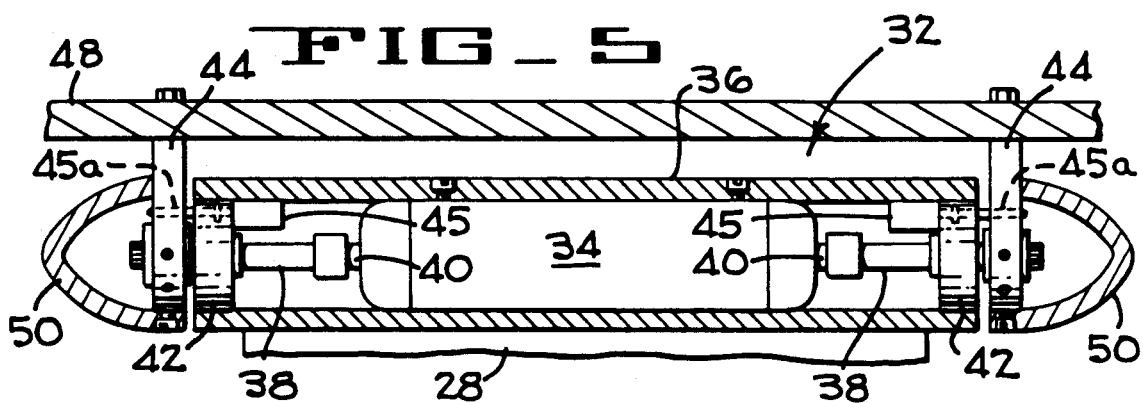

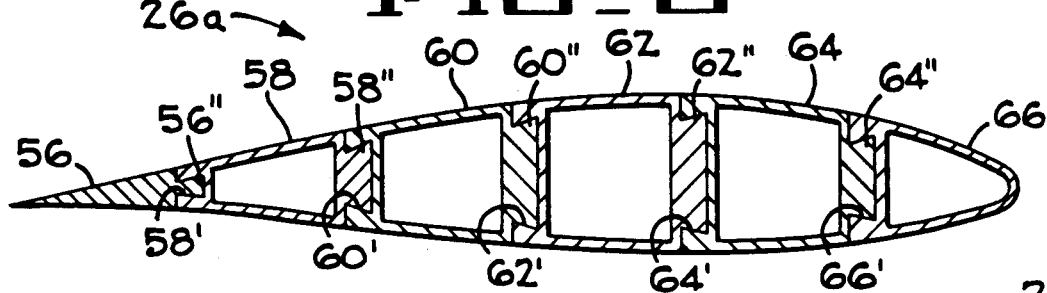
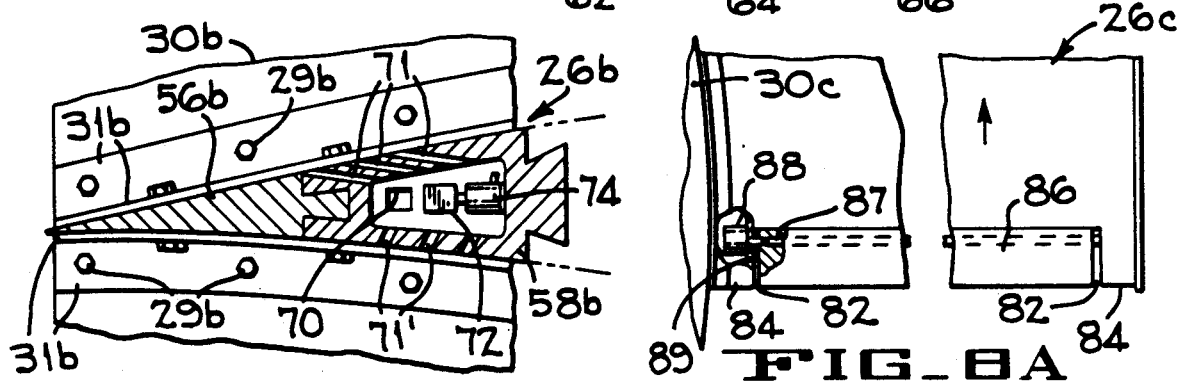
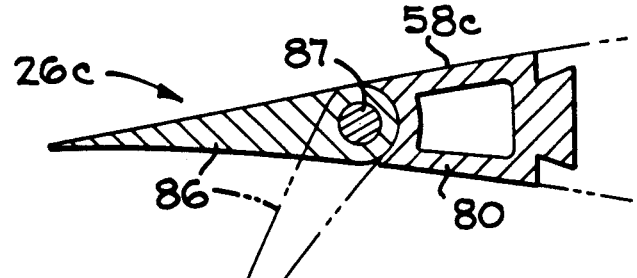
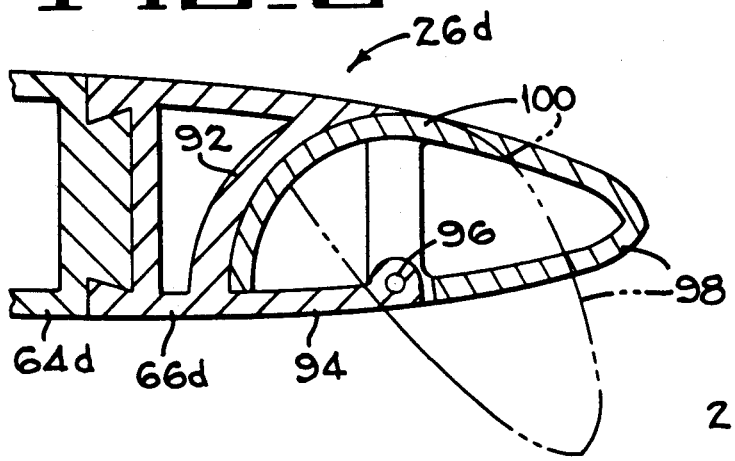
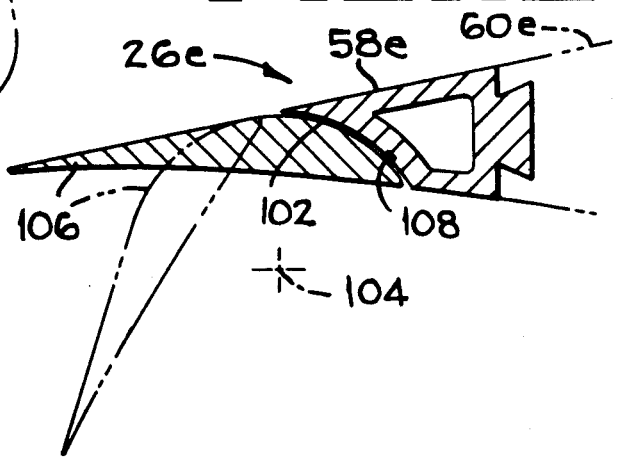
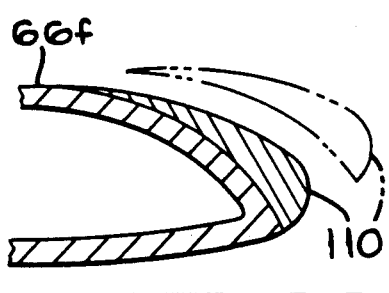

INTEGRATED PROPULSION AND HYDROFOIL SYSTEM

CROSS REFERENCE TO RELATED APPLICATION

The present application relates to Rodler, Jr. U.S. patent application Ser. No. 07/369,179 filed on June 21, 1989 entitled WATER JET PROPULSION MODULE; and Duffty et al U.S. patent application Ser. No. 07/369,173 filed on June 21, 1989 entitled AMPHIBIOUS HYDROFOIL VEHICLE, which applications are presently assigned to the assignee of the present invention.

BACKGROUND OF THE INVENTION

The present invention relates to watercrafts, and more specifically to amphibious vehicles such as assault or cargo vehicles driven by a pair of water propulsion modules, each connected between a support arm and a hydrofoil, and each being movable between a stowed position over the top of the vehicle, and a lowered position with the hydrofoils and water propulsion modules submerged in water and capable of propelling the water craft faster than 20 miles per hour.

DESCRIPTION OF THE PRIOR ART

Assignee's Samuel U.S. Pat. No. 3,420,204 discloses a water jet reactive propulsion system which is capable of propelling tracked amphibious vehicles through water at slow speeds of about 10 miles per hour.

Rodler, Jr. U.S. Pat. Nos. 3,809,005 and 4,073,257 disclose two versions of water jet propulsion systems wherein the water intake ducts and the water discharge ducts are connected by passages that require two approximately 180° reversals of direction of the propulsion water.

SUMMARY OF THE INVENTION

The integrated propulsion and hydrofoil systems of the present invention cover several systems capable of propelling watercrafts at speed in excess of 20 miles per hour and to provide sufficient lift to carry at least 50% of the weight of the watercraft and its load. The preferred embodiment of the watercraft is a tracked amphibious military vehicle for rapidly transporting troups or cargo between ships and shore when under fire from enemy forces. The weight of the watercraft and its load may be in excess of 30 tons, and the integrated propulsion and hydrofoil systems are capable of lifting in excess of 50% of the total weight when traveling in the water in excess of 20 miles per hour.

BRIEF DESCRIPTION OF THE DRAWINGS

FIG. 1 is a diagrammatic rear view of a watercraft floating in water and illustrating a first embodiment of the integrated water propulsion hydrofoil system in solid lines in a water mode, and in phantom lines in a stowed position above the watercraft.

FIG. 2 is an enlarged elevation of the right hand integrated water propulsion and foil system of FIG. 1, illustrating a water jet propulsion module positioned between a right hydrofoil and a right supporting leg pivotally connected to the watercraft by a motor.

FIG. 3 is a section taken along lines 3—3 of FIG. 2 illustrating the cross-section of a first embodiment of a hydrofoil.

FIG. 4 is a section taken along lines 4—4 of FIG. 1 illustrating the cross-section of a hollow supporting leg for accommodating power and control circuits for the water propulsion unit and other electrically or hydraulically operated components.

FIG. 5 is an enlarged section taken along lines 5—5 of FIG. 1 illustrating a motor connected to one of the integrated jet foil systems for moving the system between its lowered operative position and its raised inoperative or stowed position.

FIG. 6 is a cross-section of a portion of a second embodiment of the invention illustrating a lightweight hydrofoil composed of a plurality of parallel tubular interconnected sections.

FIG. 7 is a cross-section of a portion of a third embodiment of the invention illustrating a modified form of the trailing portion of the lightweight hydrofoil of FIG. 6 having water ports in the rear portion of the hydrofoil through which water is pumped to minimize stalling of the hydrofoil.

FIG. 8 illustrates a portion of a fourth embodiment of the invention having a movable flap on the rear end of the hydrofoil of FIG. 6 for change in foil characteristics to provide steering, roll control, and additional lift.

FIG. 8A is a plan view with parts cut away of the hydrofoil of FIG. 8 illustrating the components for operating the flaps in one of the two hydrofoils.

FIG. 9 is a portion of a fifth embodiment of the invention illustrating a drooped leading edge of a hydrofoil section similar to FIG. 6.

FIG. 10 is a portion of a sixth embodiment of the invention similar to FIG. 9 but illustrating a slotted flap in a portion of the trailing edge of the hydrofoil for minimizing stalling of the hydrofoil.

FIG. 11 is a portion of a seventh embodiment of the invention illustrating the leading edge slat in normal position in full lines, and illustrating the leading edge spaced from the leading edge of the hydrofoil to minimize stalling of the hydrofoil.

DESCRIPTION OF THE PREFERRED EMBODIMENT

A first embodiment of the integrated water propulsion hydrofoil system 20 (FIGS. 1-5) of the present invention is intended to be mounted on a watercraft 22 which may be a boat, a ship, an amphibious vehicle or other water vehicles.

As diagrammatically illustrated in FIG. 1, the water propulsion hydrofoil system 20 is shown in solid lines in its water mode mounted on an amphibious vehicle 24 of the type disclosed in our cross-referenced application entitled Amphibious Hydrofoil Vehicle.

Each integrated water propulsion hydrofoil system 20 includes a hydrofoil 26, a hollow mounting leg 28 and a power drive propulsion module 30 which is illustrated as an inline water jet propulsion module of the type disclosed in our cross-referenced application entitled water jet propulsion module. The inline water jet propulsion module is illustrated in a position connecting the associated hydrofoil 26 to the mounting leg 28 with the aid of removable connectors 27 and flanges 31, although it will be understood that the inline water jet propulsion module may be mounted at other locations on the hydrofoil. Furthermore, more than one module may be mounted on each of the hydrofoils. The mounting leg 28 and hydrofoil 26 are preferably removably connected to the outer wall of the water propulsion module 30 by the flanges 31 which conform to the contour of the adjacent surfaces and are removably connected together by cap screws 29.

Although the flanges 31 are illustrated as being bolted to the propulsion module 30, it will be understood that the flanges 31 may be cast or welded to either the hydrofoil 26, or the mounting leg 28, or the propulsion module 30; and be bolted to the other components of the integrated propulsion and hydrofoil system 20.

As diagrammatically illustrated in FIG. 5, the power unit 32 includes an electric or hydraulic motor 34 rigidly secured within a waterproof housing 36 which is secured to an associated one of the hollow mounting legs 28. Splined shafts 38 are coupled to the ends of the motor shaft 40 and are journaled in end walls 42 of the housing 36. The end portions of the shafts 38 are splined to brackets 44 which are bolted to the adjacent side walls 46,48 of the watercraft 22. Parabolic end caps 50 are bolted to the brackets 44 to minimize drag when moving through water at low speeds. A pair of power means 45 such as solenoids having pins 45a connected thereto, are mounted on the housing end walls 42 and are operated to lock the hydrofoils 26 in a water mode as shown in FIGS. 1 and 5, and a stowed position as illustrated in phantom lines in FIG. 1.

The mounting legs 28 (FIGS. 2 and 4) are hollow as indicated in FIG. 4 in order to receive power and control lines 52 from the power units and control systems (not shown) of the watercraft 22.

As indicated in FIG. 3, the hydrofoils 26 of the first embodiment of the invention are formed as solid members with airfoil shapes which provide lift. A fence 54 projects beyond the outer ends of each hydrofoil 26 for minimizing water movement around the outer ends thereof.

FIG. 6 is a cross-section of a lightweight hydrofoil 26a of a second embodiment of the invention which is preferably formed from aluminum or composite material. As illustrated, the hydrofoil 26a is formed from six wing sections 56,58,60,62,64 and 66. Each section has a different upper and lower profile as illustrated in FIG. 6, which sections extend the full length of the hydrofoil 26a. The rear portion of each section, except the trailing section 56, includes an isosceles trapezoidal groove 58', 60', 62', 64 40 and 66', respectively; which slidably receive dovetail tongues 56", 58", 60", 62" and 64", respectively, as clearly illustrated in FIG. 6. The several elongated hydrofoil sections of each hydrofoil have their outer ends bolted to a fence (not shown) but similar to the fence 54 (FIGS. 1 and 2), and have their inner ends removably secured to the propulsion modules by flanges and removable connectors in the same manner as that disclosed in the first embodiment of the invention.

FIG. 7 is an enlarged section of a third embodiment of the hydrofoil 26b illustrating the two rear sections 56b and 58b of the hydrofoil 26b that are similar to the FIG. 6 embodiment and are connected to the adjacent water propulsion modules 30b by removable connectors 29b and flanges 31b.

A relatively small volume of water passes from the water propulsion modules 30b through one or more openings 70 in the wall of the propulsion module into the hollow hydrofoil section 58b. Rearwardly directed passages 71 in an upper and/or lower wall of the section 58b allow a plurality of streams of water to wash over the rear portion of the hydrofoil 26b when the hydrofoil is in or near a stall position. Similar passages 71' are provided in the lower surface for performing the same function. A gate 72 is connected to the power or differential pressure means 74, such as a waterproof solenoid, for opening the gate 72 when stalling conditions are detected, and closing the gate 72 when normal flow is restored.

FIGS. 8 and 8A illustrate a rear portion of the fourth embodiment of the hydrofoil 26c which is the same as the FIG. 6 embodiment except for the trailing hydrofoil sections 58c.

A single elongated section 80 (FIG. 8) is substituted for the two rear sections of the FIG. 6 embodiment. The single elongated section 80 is assembled in the next forward section and includes a wide gap 82 (FIG. 8A) in the trailing edge between end portions 84. As illustrated, a wide flap 86 extends substantially the full span of the hydrofoil 26c and is pivotally supported on the hydrofoil by a pivot rod 87 for movement between a position in alignment with the normal trailing portion 84 as shown in FIG. 8A and a lower high lift position as shown in FIG. 8. A motor 88 is secured to a wall 89 in the hydrofoil prior to assembling the hydrofoil on the associated water propulsion module 30c and is connected to the pivot rod 87 by splines. The other end of the pivot rod 87 is received in a conventional bearing (not shown) in the outer end portion 84 of the hydrofoil 26c. A similar flap (not shown) is mounted on the other hydrofil 26c and is powered by another motor (not shown) but similar to the motor 88. Energization of the motors 88 (only one being shown) will lower the flaps 86 on one hydrofoil 26c independently of the other hydrofoil (not shown) thereby providing roll as well as steering.

FIG. 9 illustrates the front portion in cross-section of a fifth embodiment of the hydrofoil 26d which is substituted for the two front hydrofoil sections 66 and 64 of the FIG. 6 embodiment. The section 64d is connected to the next forward portion 66d of the hydrofoil and includes an arcuate front wall 92 and several lower arms 94 (only one being shown) which rotatably receive a pivot shaft 96 therein. A front droop snoot or flap 98 is keyed to the shaft 96 and has a thick profile with an arcuate portion 100 which is movably received within the arcuate rear wall 92. Power means (not shown) but similar to the power means 88 (FIG. 8A) is connected to the shaft 96 for moving the flap 98 between its solid line and phantom line positions. When in the phantom line position, the hydrofoil 26d provides additional lift for more rapidly raising the rear portion of the watercraft 22.

FIG. 10 illustrates a sixth embodiment of the invention with the two trailing sections of the hydrofoil 26e including a forward wing section 58e that is connected to the next forward section 60e. The rear portion of the section 58e has an arcuate rear surface 102 generated about an axis 104. Conventional linkages and power means (not shown) allow a flap 106 to pivot about axis 104 between the high speed position shown in cross section, at which time a resilient seal 108 prevents water from flowing between the adjacent arcuate surfaces; and a high lift position shown in phantom lines.

FIG. 11 illustrates a portion of a seventh embodiment of the invention with the leading or front section 66f (only a fragment being shown) being substituted for the front section 66 shown in FIG. 6. The FIG. 11 embodiment includes an extendable leading edge slat 110 shown in phantom lines extended to prevent stall by power or differential pressure means (not shown) when stalling conditions are detected, and is retracted when normal flow is restored.

From the foregoing description it is apparent that the integrated water propulsion hydrofoil system of the present invention includes two pair of mounting legs and hydrofoils removably connected at their junction to associated water propulsion modules which are mounted on a watercraft for movement of the hydrofoils and propulsion modules between a stowed position above a watercraft which includes an amphibious vehicle; and an operative water mode with the water propulsion modules of the hydrofoils being lowered under the level of water for moving the watercraft at speeds in excess of 20 miles per hour. A plurality of hydrofoil sections have been disclosed which will support a substantial portion of the weight of the watercraft and its load when moving at high speeds and provides trim control of the vehicle. When accelerating to high speeds, several types of hydrofoils with lift assisting apparatus in the rear portion of the hydrofoil will be lowered to provide more lift at slow speed and will be raised into high speed position when the forward speed of the watercraft provides the desired lift.

Although the best mode contemplated for carrying out the present invention has been shown and described, it will be apparent that modification and variation may be made without departing from what is regarded to be the subject matter of the invention.

What is claimed is:

1. An integrated propulsion and hydrofoil system for use on a watercraft, comprising;
    means defining a pair of inline water jet propulsion modules;
    means defining a pair of hydrofoils connected to said inline water jet propulsion modules;
    means defining a pair of mounting legs each having one end connected to an associated inline water jet propulsion module and another end movably connected to said watercraft for allowing movement of said associated hydrofoil and said associated water propulsion module between an operative position within the water and a stowed position out of said water;
    means for selectively locking the integrated propulsion and hydrofoil system in said operative positions and in said stowed positions;
    said watercraft being an amphibious vehicle having a top and side walls, one of said integrated propulsion and hydrofoil systems being movably supported on each side of the amphibious vehicle for pivotal movement about axes parallel to said side walls only over for movement of each water propulsion module and each hydrofoil between said operative position within the water and said stowed position out of the water and above said top of said amphibious vehicle; said pair of hydrofoils each being constructed from a plurality of longitudinally extending lightweight transversely spaced tubular sections adjacent ones of said tubular sections being connected together by adjacent isoceles trapezoidal tongues and grooves; and
    a trailing section connected to the rearmost tubular section by one of said tongue and groove connections thereby forming an air foil shaped hydrofoil;
    means defining a plurality of slots extending through a wall of one of said rearmost tubular sections; and
    means defining wash water openings between said rearmost tubular section and said water propulsion module for receiving water under pressure from said water propulsion module and for directing a plurality of streams of pressurized water rearwardly relative to and spaced from the trailing portion of said hydrofoil for providing additional lift only when said hydrofoil is near a stall position.

2. An apparatus according to claim 1 and additionally comprising:
    movable gate means positioned to open and close said wash water openings, and power means for opening said wash water openings when said watercraft is moving at slow speeds and to close said wash water openings when said watercraft is moving at high speeds.

* * * * *